United States Patent [19]
Holmberg et al.

[11] 3,759,384
[45] Sept. 18, 1973

[54] APPARATUS FOR GRADING LUMBER

[76] Inventors: Bo F. Holmberg, Box 20, Hammar; Nils E. Hellström, Strandvager 21; Sigurd K. J. Modin, Sveavagen 7, all of Nyland, Sweden

[22] Filed: Sept. 1, 1971

[21] Appl. No.: 177,016

[52] U.S. Cl............. 209/122, 198/33 AD, 209/73, 209/82
[51] Int. Cl............................................. B07c 1/18
[58] Field of Search.............. 198/33 AD; 209/73, 209/82, 122

[56] References Cited
UNITED STATES PATENTS

| | | | |
|---|---|---|---|
| 2,754,964 | 7/1956 | Muller | 198/33 AD X |
| 3,247,963 | 4/1966 | Fehely | 198/33 AD X |
| 3,288,268 | 11/1966 | Fehely | 198/33 AD X |
| 3,306,427 | 2/1967 | Spencer | 198/33 AD X |
| 3,495,707 | 2/1970 | Davies | 209/82 X |

*Primary Examiner*—Richard A. Schacher
*Attorney*—J. C. Holman et al.

[57] ABSTRACT

A high capacity lumber grading apparatus in which transverse conveyor means transport lumber pieces to be graded one by one past a grader and in which means lift each lumber piece to be graded in an arcuate path in front of the grader and simultaneously turn the piece to present the longitudinal sides and edges thereof to the grader.

5 Claims, 6 Drawing Figures

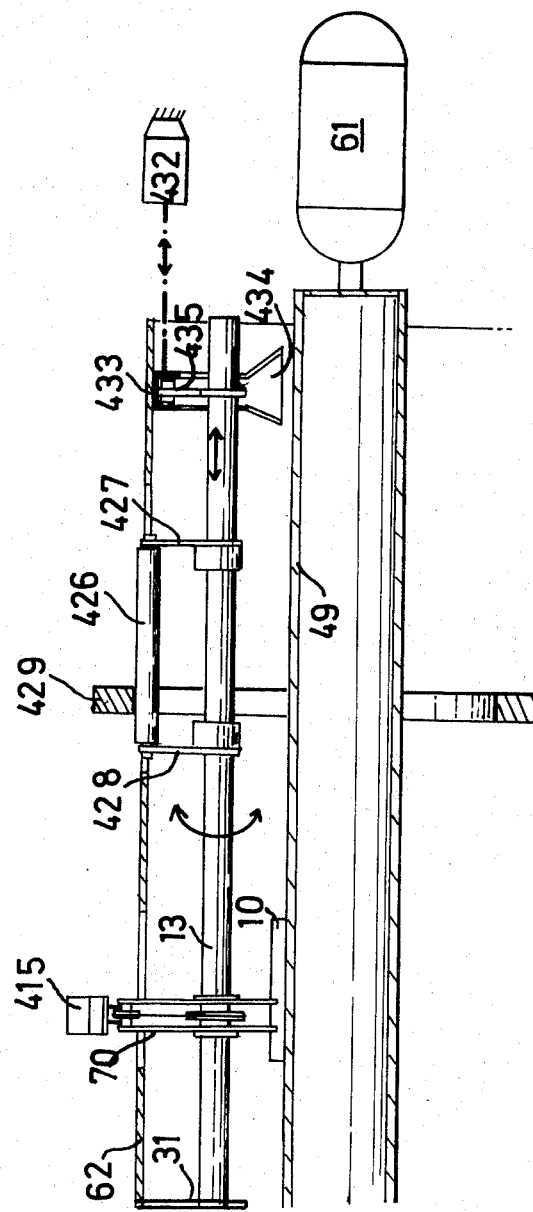

3,759,384

APPARATUS FOR GRADING LUMBER

The present invention relates to a high capacity lumber grading, sorting and cutting or trimming apparatus of the kind, which is constructed around a transverse conveyor adapted to transport lumber pieces in a spaced, parallel relation by means of dogs attached to chains or the like.

PRIOR TECHNIQUES

Most operations in a modern lumber handling apparatus of the kind intended may be purely automatic, but the grading and determination of optimum root and top cuts still has to be made by a grader through inspection of each individual lumber piece, as it passes by him on the conveyor.

OBJECTS AND SUMMARY OF THE INVENTION

Judging and grading lumber requires a high degree of skill, and it is the main object of the present invention to free the grader from any unnecessary manual labor, and to present to him the individual lumber pieces in a manner which will enable him to work at a high and yet comfortable rate.

Modern saw-mills, however, have a capacity which is greater than any individual grader can handle by himself. It is therefor another object of the present invention to provide an apparatus of the kind indicated above in which two or more graders may work side by side, with each of them judging predetermined pieces of lumber of the total quantity of lumber.

It is still a further object of the present invention to provide interlock and synchronization means for presenting to each grader, present at any specific time at a grading station, a series of lumber pieces to be graded at a predetermined rate.

It is still a further object of the present invention to provide means for registering and storing signals from each grader signifying the ultimate destination and/or length of each graded piece of lumber.

These and further objects and advantages of the present invention will become more apparent upon reference to the following specification and claims, and the appended drawings.

DESCRIPTION OF THE DRAWING FIGURES

FIG. 6 shows, in a smaller scale, the mechanism according to FIGS. 4 and 5 in relation to i.e., support means located below and out of the plane of the conveyor.

DESCRIPTION OF A PREFERRED EMBODIMENT

The Main Block Diagram.

Figure 1:
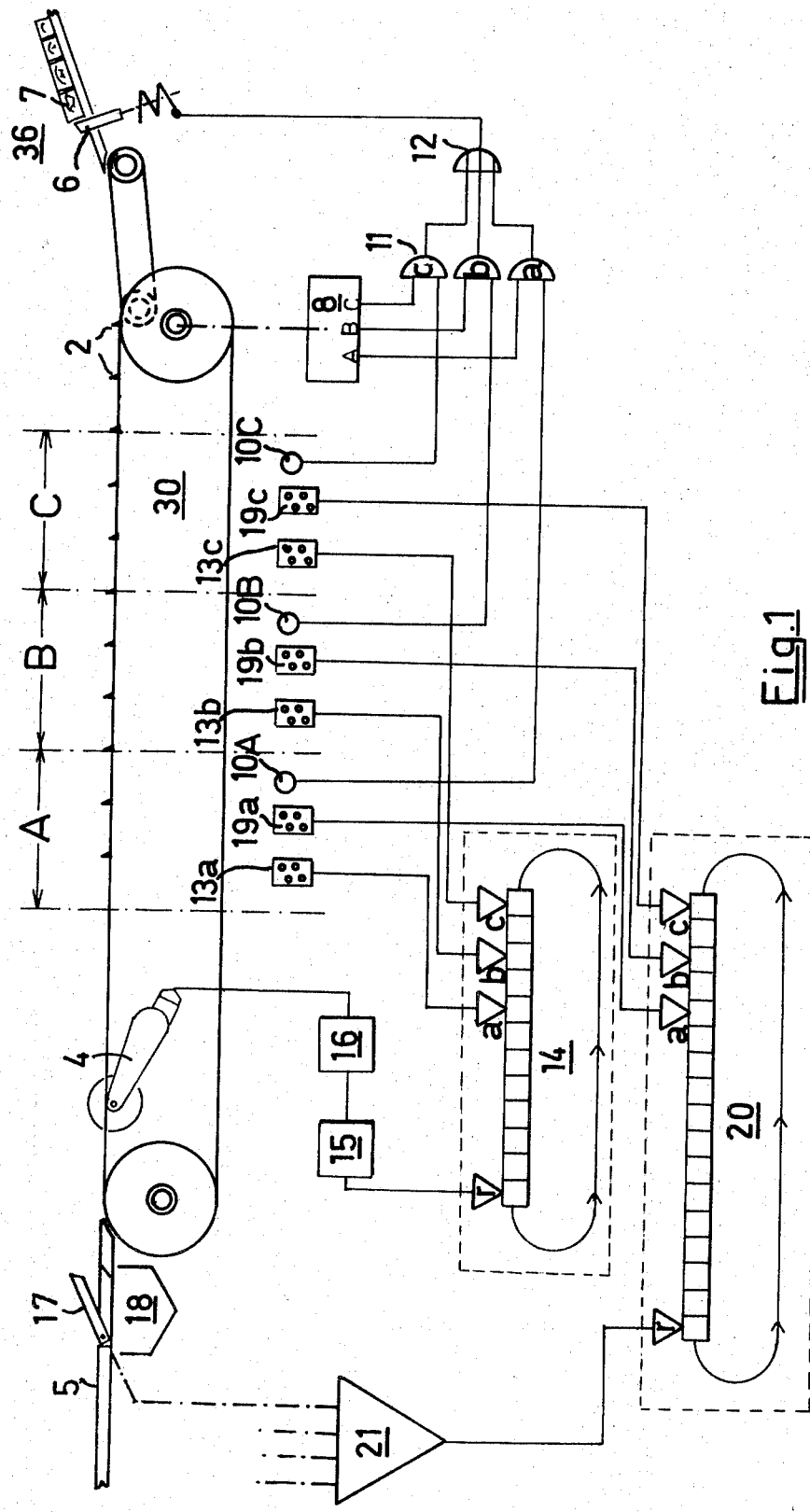
FIG. 1 is a main block diagram of an apparatus according to the invention.

In the main block diagram of FIG. 1 is illustrated a conveyor 30, which in a manner per se comprises a plurality of endless, parallel belts or chains 34, each provided with regularly spaced dogs 2, with said conveyor being adapted to transport lumber pieces, boards or the like 31 in parallel relationship in a transverse direction, i.e., in the embodiment from the right to the left, the lumber pieces being perpendicular to the plane of the drawing.

A feeding device 36, known per se from e.g. U.S. Pat. application Ser. No. 828.933 to N.E.Hellstrom, is located at the input end of the conveyor 30. Near or immediately before the output end of the conveyor 30 is a cutting or trimming device 4, which may either be of the kind shown and described in U.S. Pat. Ser. No. 3.584.664 to Bo Holmberg et. al. or, preferably, of the kind described in co-pending U.S. Pat. application Ser. No. 177,016, filed Sept. 1, 1971 and entitled SIGNAL CONTROLLED TRIMMING DEVICE.

After having been trimmed to the desired length, the boards are transferred from the output end of the conveyor onto a sorter 5 having a plurality of electrically operable covers 17 each located above a pocket 18 into which a lumber piece 31, upon activation of the corresponding cover 17 falls and in which it is stored until the pocket 18 is filled. A sorter or sorting table of this kind is also known per se from e.g. U.S. Pat. Ser. No. 3.498.503 to Bo Holmberg et. al.

According to the present invention there is provided at least one, preferably two or three inspection places A, B and C, and each inspection place may or may not be occupied by a grader. Thus a feeding device 36 is provided, in FIG. 1, with a locking member 6, which is electromechanically operable and located in the path of travel of lumber pieces 7. Upon activation, the locking device allows one piece of lumber to be transported to the conveyor 30.

A commutator 8 or a similar pulse signal generating device is operating in synchronization with conveyor 1, and adapted to generate three pulse trains 8/A, 8/B and 8/C respectively, such that the signal 8/A appears when a dog 2 is in receiving position at the input end of the conveyor 30, which dog is intended to transport a piece of lumber 7 to be graded at grading position A. Signals 8/B and 8/C similarly are synchronized with the appearance of dogs intended to transport pieces of lumber to be graded at grading positions B and C respectively, and it should be realized that the respective pulse trains are 120° out of phase with respect to one another, and that in each pulse train, a pulse will appear concurrent with every third dog on the conveyor.

At every grading station, there is provided a pushbutton or key operable switch 10A, 10B and 10C respectively, adapted to normally generate a "present"-signal, and to generate an "absent" or inhibiting signal when activated.

The signals 8/A, 8/B and 8/C are combined with the signals from the switches 10A, 10B and 10C respectively in AND-gates 11a, 11b and 11c, the outputs of which are supplied as input-signals to OR-gate 12, in order to allow only the respective signals from the pulse train generator 8 to activate the locking member 6 if the grader at the respective grading position has signified his presence or readiness to receive lumber for grading by not operating his individual inhibiting switch 10.

Figure 2:
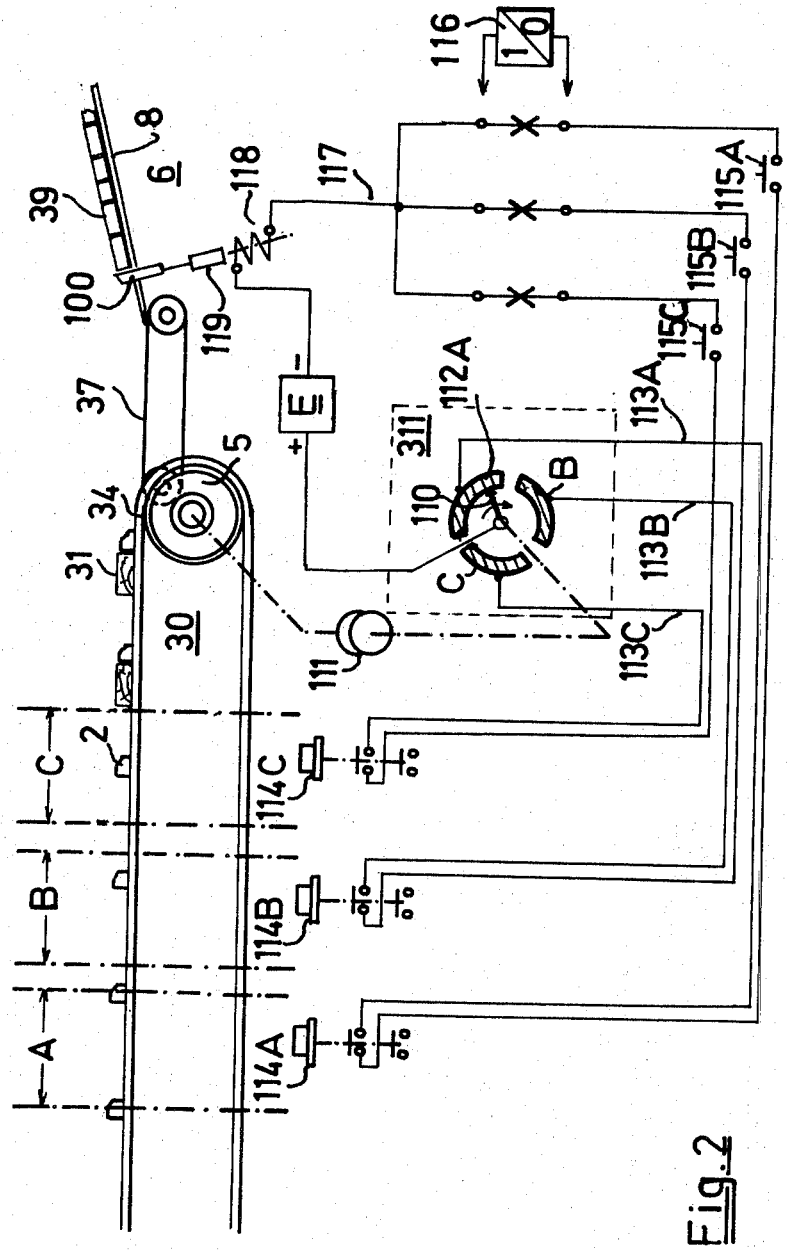
FIG. 2 is a block diagram of circuit means for selectively feeding lumber pieces at a predetermined rate to predetermined positions on the conveyor.

Referring now to FIG. 2 there is shown, more in detail, how an actual control circuit may be built up to realize the abovementioned function.

Thus, in FIG. 2, the pieces of lumber 31 are transported on the conveyor 30 comprising endless chains 34 provided with dogs 2. As in FIG. 1, grading positions A, B and C are located along the conveyor and are provided with means for presenting lumber pieces to the grader. These means will be further described with reference to FIGS. 3–6. At the input end, the transport chains 34 of the conveyor 30 run over chain wheels 35. The feeding device generally designated 36 is of a kind known per se, as mentioned above with reference to FIG. 1, and comprises an inclined table 38 on which a layer of lumber pieces 39 rests, a locking member 100 normally preventing the lumber from sliding down onto an intermediate conveyor 37. The locking member 100, however, is provided with an armature 119 which may be acted on by electromagnet 118, as will be further described.

Via a suitable gear box 111, wiper 110 of a commutator generally designated 311 is turned in synchronization with the travel of the dogs 2 on the conveyor 30. The wiper arm is electrically connected to the positive terminal of a current source E, the negative terminal of which is connected to one terminal of the electromagnet 8.

The cummutator or distributor 311 comprises three contact segments 112A, 112B and 112C, connected by lines 113A, 113B and 113C respectively to one terminal of normally open contacts 114A, 114B and 114C at the grading or inspection places A, B and C respectively.

The respective grader indicates that he is prepared to receive lumber pieces for grading by closing the push-button or key switch 114 assigned to him. Provided also that the respective switches 115A, 115B and 115C are closed, the locking member 100 will be actuated accordingly by coil 118 and armature 119, thus causing one piece of lumber at the time from the layer 39 to be placed in front of selected dogs 2.

Switches 115A–115C may be located at any convenient place in the system, e.g. at the desk of a foreman, or they may be part of any suitable automatic device for regulating the lumber feed. The circuit may also contain a flip-flop divider 116 in one or more of the lines before terminal 117, to be used e.g. in the training of a grader in order to reduce the rate at which lumber pieces are placed before selected dogs.

The circuit of FIG. 2 is, of course, capable of many modifications which should be obvious to anyone skilled in the art, and the circuit is only included here for explanatory purposes.

Returning once more to FIG. 1 there is shown, that for each one of the graders A, B and C, there is provided a first set of push-buttons 13a, 13b and 13c respectively, by means of which the grader, by pushing a selected button, might indicate the intended length for each lumber piece to be graded.

The signals are fed to a cyclic memory device 14, at different cyclic locations depending upon the actual "dog number distance" between the respective grading place and the trimmer device 4. Thus, signals emanating from grading position A will be fed to the memory device 14 at a point, a, further towards read head, r, than signals from the grading position B or C.

The memory device 14 is recycled at a rate synchronous with the speed of the transverse conveyor 1, with the signals stored being cylically read by a read head, r, amplified in an amplifier 15 and fed to a decoder 16 serving to activate the desired trimmer device 4.

In a similar manner, there is provided for each grader a second set of push buttons 19a, 19b and 19c respectively, the output of which is fed to a second cyclic memory device 20. The second set of push buttons is used to indicate the quality or grade of each piece of lumber, and the output from the cylic memory device 20 is used to operate the different covers 17 in the sorter 5 via a matrix 21 in order to have each piece of lumber dropped into the predesignated pocket 18.

Figure 3:
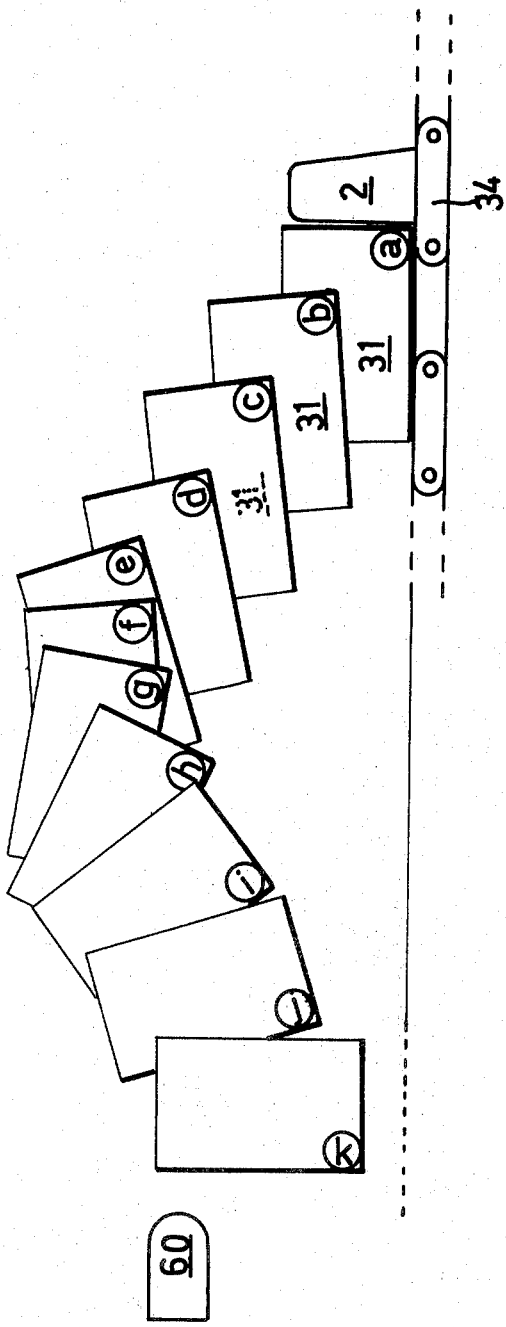
FIG. 3 is a diagram illustrating the movement and path of travel of a lumber piece as it passes the grader.

Referring now to FIG. 3 there is shown a diagram of the desired movement and path of travel of a piece of lumber 31, as it passed the grader. It will be appreciated that this movement consists of a first phase,(a)-(e), where the piece of lumber is lifted and at the same time turned some 15° in the counter-clockwise direction. In the second phase,(f)-(g), the piece of lumber is kept at essentially the same altitude over the conveyor, and turned some 30° in the clockwise direction. In the third phase ,(h)-(k), the piece of lumber is again lowered, and turned 75° in the clockwise direction. After each position k, the piece of lumber will come in contact with the conveyor with its initially rear edge, and abutment means 60 will cause the piece of lumber to ultimately topple 90° in the clockwise direction, where it will come to rest on its initially lower face resting on the conveyor in front of the same dog by which it originally was transported.

It will be appreciated, that in this manner both sides and edges of the piece of lumber will be presented to the grader, and that this presentation will for all practical puposes have the appearance of a continuous movement where the edges and sides will be seen to "unroll" in front of the grader.

Figure 4:
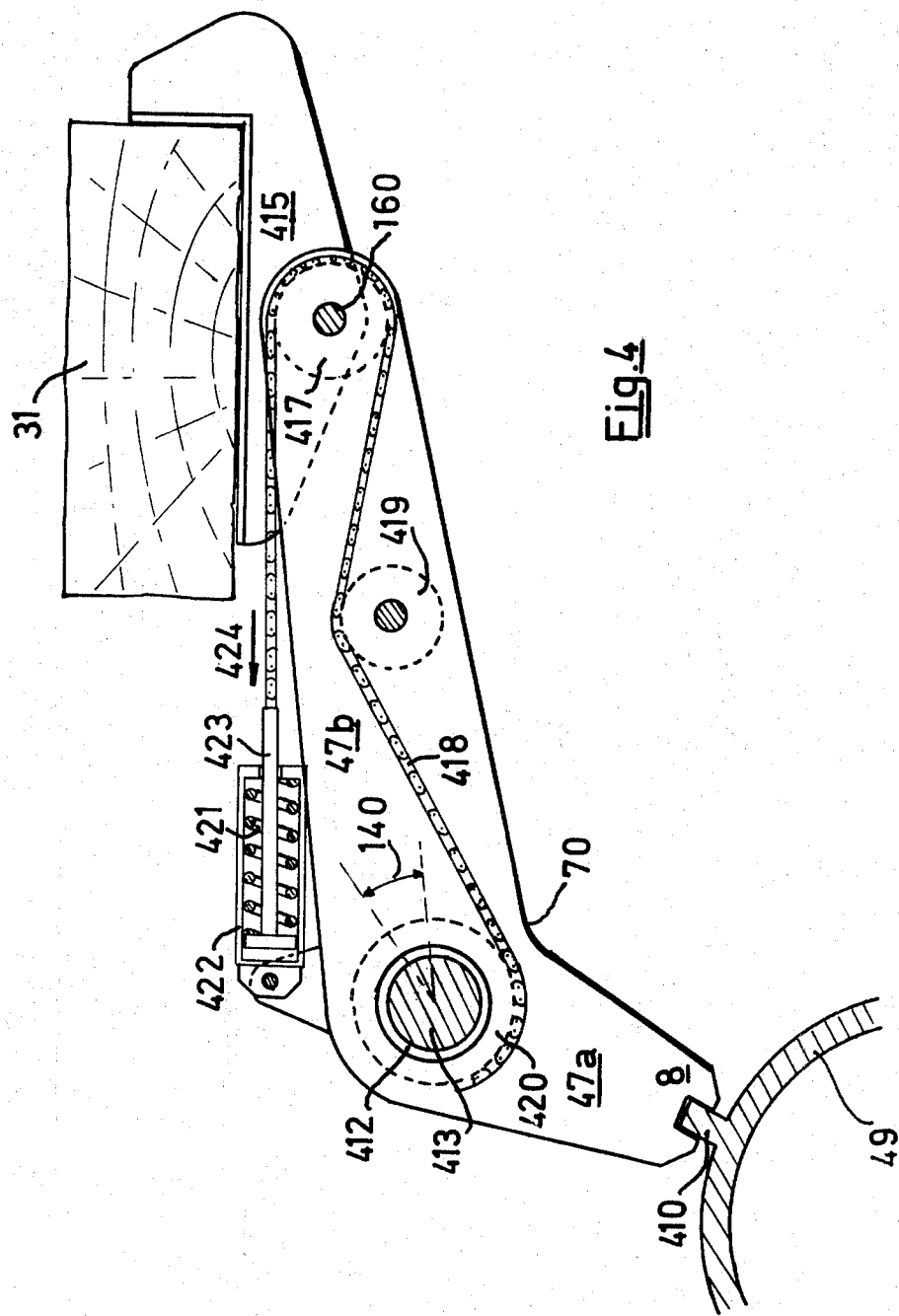
FIG. 4 shows part of a mechanism for imparting to a piece of lumber the movement illustrated in FIG. 3.
Figure 5:
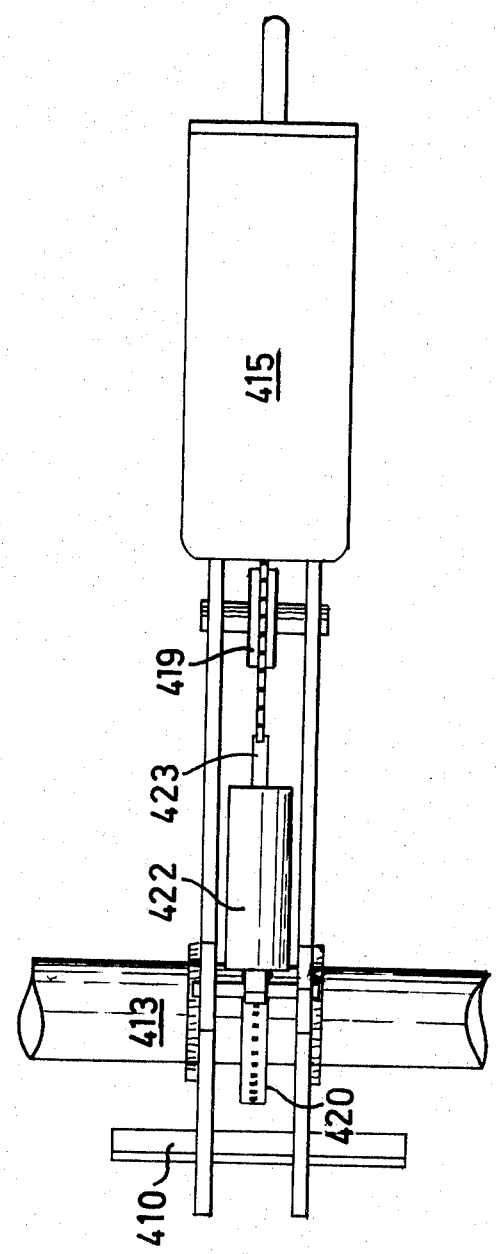
FIG. 5 shows the mechanism according to FIG. 4 viewed from above.

Referring now to FIGS. 4, 5 and 6, in particular to FIG. 4, there is shown a mechanism for generating the movement described in connection with FIG. 3.

The lifting and turning mechanism is located below the conveyor previously described, and adapted to take one piece of lumber 31 at a time, raise it above the conveyor and simultaneously turn it, as shown and described in connection with FIG. 3.

The mechanism comprises an angular arm 47 having a shorter shank 47a and a longer shank 47b. At free end 48 of the shorter shank 47a, there is a recess cooperating with a corresponding ridge 410, on a central shaft 49, around which the mechanism rotates, as will be described, in more detail, below, particularly with reference to FIG. 6.

The arm 47 is journalled on a shaft 413 by means of a bearing 412, and the arm may turn about the shaft within the angle 140. On the shaft 413 is a stationary chain wheel 420 to which one end of a chain 418 is attached. From the chain wheel 420 the chain 418 extends over an idler wheel 419 and a further chain wheel 417, and the opposite end of the chain is attached to a piston rod 423, acted upon by a spring 421, enclosed in a housing or cylinder 422, which in turn is attached to the arm 47.

The chain wheel 417 is attached by means of a shaft 160 to an L-shaped hook or lifting member 415 on which the piece of lumber 31 to be inspected is carried.

It will be appreciated, that should the arm 47 turn with respect to the shaft 413, the chain linkage described would cause the lifting member 415 to also turn, and to change its angle with respect to the arm 47.

Referring now to FIG. 6, there is shown a part of the lifting and turning mechanism, as viewed from above. By means of a motor 61 central, tubular shaft 49 is turned in absolute synchronization with the conveyor, i.e., there is always a constant relation between the angular position of the tube 9 and the position of a dog along the path of travel of the conveyor. This may be secured by any suitable transmission known per se, and forms no part of the invention.

On the shaft 413, however, there are two radial arms 427 and 428 supporting between their free ends a cam follower 426, the periphery of which has a varying radial distance with respect to the longitudinal axis of the tubular shaft 49, indicated in a somewhat exaggerated manner in FIG. 6. It will be understood, that as the mechanism turns with respect to the stationary annular cam 429, any change in curvature of the inner periphery will cause, via the cam follower 426, arms 427, 428, the shaft 413 to turn accordingly.

It should be understood as well, that an outer cover 62 is rotating in synchronization with the inner shaft 49, and that shaft 413 is secured to the outer cover by support members 431.

It should now be understood, that as the shaft 49 rotates under the conveyor, the free end of the longer shank 47b will describe an arcuate path over the conveyor, thus providing the generally arcuate lifting and lowering of the piece of lumber illustrated in FIG. 3. At the same time the arm 47 will turn about the shaft 413, which in turn causes the L-shaped member 415 to turn with respect to the arm, and this movement, ultimately determined by the contour of the inner periphery of the annular cam 429, imparts to the piece of lumber 31 the turning movement indicated in FIG. 3.

Thus, the mechanism described with reference to FIGS. 4, 5 and 6 is adapted to impart to a piece of lumber the lifting, turning and lowering movement described with reference to FIG. 3.

In order for the grader to be able to impart either by direct command or via the control equipment a transverse movement, so that the respective pieces of lumber may be correctly aligned with their root ends with respect to a stationary trimmer 4, there is also provided means for moving the mechanism described above in the transverse direction.

It should be understood, that since lumber pieces are of considerable length, at least two of the mechanisms shown and described, and spaced in the lateral direction of the conveyor, are necessary, but that these mechanisms in every respect are similar, and that for this reason but one of them is shown in the drawings. Thus, there is provided, as shown in FIG. 6, an arcuate steering channel 433 in which a follower 435 attached to the shaft 413 engages. The steering channel 433 is movable in the transverse direction by means of a servo-motor 432, and thus the whole assembly may be moved together with the piece of lumber being graded. The movement is only limited by the axial length of the cam follower 426 and may be from 1' to 3' or 4'.

The servo-motor 432 may be operated either by a control from the grader or by automatic means from the control equipment.

We claim:

1. A high capacity lumber grading apparatus, comprising transverse substantially horizontal conveyor means for transporting successive pieces of lumber past a grader in spaced, predetermined locations on said conveyor means, and lumber piece turning means in front of the grader for turning the lumber pieces one by one to present to the grader the pair of edges and sides thereof, the improvement that the lumber piece turning means include at least two substantially L-shaped members, individual substantially radial arms having inner and outer ends, each of said L-shaped members being swingably journalled to the outer end of a radial arm, a rotating shaft below the plane of the conveyor means, the inner ends of said arms being carried on the rotating shaft, means continuously turning the L-shaped members to a predetermined angle with respect to the plane of the conveyor means, said angle being everywhere dependent by the angular position of the radial arm with respect to the plane of the conveyor means to cause at least a pair of opposite, parallel spaced apart radial arms and L-shaped members to lift one piece of lumber from a location upstream on the conveyor means, transport the piece of lumber in an arcuate path over the plane of the conveyor means substantially corresponding to the path of travel of the outer ends of the radial arms, during transport to turn the piece of lumber to present to the grader, both edges and sides in a manner approximating a continuous movement, the turning being essentially in the opposite direction of the turning of the radial arms, and repositioning the piece of lumber in the predetermined location on the conveyor means downstream of the grader.

2. Lumber grading apparatus as claimed in claim 7, characterized in that two or more grading stations are provided along said transverse conveyor means, each of said grading stations comprising lifting and turning means for said pieces of lumber.

3. Lumber grading apparatus as claimed in claim 2, characterized in that interlock means are provided for selectively feeding pieces of lumber to said conveyor means only at such locations that corresponds to an operating grading station.

4. Lumber grading apparatus as claimed in claim 1, characterized in that each grader is provided with individually operable signal generating means for indicating the desired length and/or the grade of each piece of lumber graded by him, and memory means being provided for temporary storing of said signals.

5. Lumber grading apparatus as claimed in claim 1, characterized in that means are provided for selectively moving said pieces of lumber in the longitudinal direction, in order to line them up according to the intended root or top end cut.

* * * * *